(12) United States Patent
Kuras

(10) Patent No.: US 6,424,902 B1
(45) Date of Patent: Jul. 23, 2002

(54) METHOD AND APPARATUS FOR OPERATING A CONTINUOUSLY VARIABLE TRANSMISSION IN THE TORQUE LIMITED REGION NEAR ZERO OUTPUT SPEED

(75) Inventor: Brian D. Kuras, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/699,953

(22) Filed: Oct. 30, 2000

(51) Int. Cl.$^7$ .................................................. G06F 7/00
(52) U.S. Cl. ............................ 701/51; 701/54; 701/61
(58) Field of Search ............................. 701/51, 54, 60, 701/61; 477/34, 128

(56) References Cited

U.S. PATENT DOCUMENTS

| | | |
|---|---|---|
| 4,368,798 A | 1/1983 | Meyerle et al. |
| 4,464,952 A | 8/1984 | Stubbs |
| 4,844,221 A | 7/1989 | Sakai et al. |
| 4,852,429 A | 8/1989 | Kunzer et al. |
| 5,024,306 A | 6/1991 | Fukui et al. |
| 5,157,609 A | 10/1992 | Stehle et al. |
| 5,168,449 A | 12/1992 | Benford |
| 5,445,128 A * | 8/1995 | Letang et al. ................ 123/436 |
| 5,988,335 A | 11/1999 | Kupferschmid et al. |
| 5,996,343 A | 12/1999 | Kuras |
| 6,001,038 A | 12/1999 | Wontner et al. |

* cited by examiner

*Primary Examiner*—Yonel Beaulieu
(74) *Attorney, Agent, or Firm*—Steve M. Hanley

(57) ABSTRACT

An apparatus for controlling a continuously variable transmission includes an input shaft driven by an engine, an output shaft, an operator input for generating speed commands and a controller operable to receive the speed commands and generate transmission ratio commands which control a ratio of a speed of the output shaft to a speed of the input shaft. Torque of the output shaft is limited in a torque limited region near zero speed of the output shaft and the transmission ratio command is modified in the torque limited region.

20 Claims, 6 Drawing Sheets

METHOD AND APPARATUS FOR OPERATING A CONTINUOUSLY VARIABLE TRANSMISSION IN THE TORQUE LIMITED REGION NEAR ZERO OUTPUT SPEED

TECHNICAL FIELD OF THE INVENTION

The present invention generally relates to a continuously variable transmission, and more specifically to a method and apparatus for operating a continuously variable transmission in a output torque limited region near zero output speed.

BACKGROUND OF THE INVENTION

Many work machines, particularly earth working machines, use a continuously variable transmission to drive traction wheels or tracks which propel the work machine. Typically, a hydrostatic transmission, consisting of a variable speed hydraulic pump and a hydraulic motor, provides a continuously variable speed output to the wheels or tracks of the work machine. In particular, the speed output can be continuously varied by controlling the displacement of the hydraulic pump.

An engine provides power to the transmission which controls speed and torque at the power level. For example, the transmission can increase output torque output by decreasing the output speed. On the other hand, the transmission can decrease output torque output by increasing the output speed.

Continuously variable transmissions are capable of providing an output at any speed within its operating range. Therefore, the continuously variable transmission can provide extremely large amount of output torque near zero output speed. In fact, this output torque may exceed the capability of various components of the transmission and drivetrain. To prevent the failure of these transmission and drivetrain components, output torque must be limited near zero output speed.

In the hydrostatic transmission, output torque is limited near zero output speed by a pressure cutoff device. This pressure cutoff device reduces the displacement of the variable displacement pump when the pressure within the hydrostatic transmission exceeds a threshold value. Thus, the transmission ratio is automatically reduced whenever the pressure within the hydrostatic transmission exceeds the threshold value.

A drawback to using the pressure cutoff device is that it may reduce the effectiveness of the transmission controls when the displacement of the variable displacement pump is limited. For example, when the transmission is experiencing a large load, the controls may implement an underspeed algorithm which limits the ratio of the transmission to prevent the engine from stalling. However, when operating within a output torque limited region caused by the operation of the pressure cutoff device, the change in displacement caused by the pressure cutoff device will cause the engine to operate as if the load is reduced. In fact, if no adjustment is made to the underspeed control, the transmission may not be able to react quickly to new loads that would cause the engine 12 to lug.

What is needed therefore is a method and apparatus for operating a continuously variable transmission within the torque limited region near zero output speed which overcomes the above-mentioned drawbacks.

DISCLOSURE OF THE INVENTION

In accordance with a first aspect of the present invention, there is provided an apparatus for controlling a continuously variable transmission. The apparatus includes an input shaft driven by an engine and an output shaft. The apparatus further includes an operator input for generating speed commands and a controller operable to receive the speed commands and generate transmission ratio commands which control a ratio of a speed of the output shaft to a speed of the input shaft. Torque supplied to the output shaft is limited in a torque limited region near zero speed of the output shaft. The transmission ratio command is modified in the torque limited region.

In accordance with a second aspect of the present invention, there is provided a method for controlling a continuously variable transmission. The transmission includes (i) an input shaft driven by an engine, (ii) an output shaft, (iii) an operator input for generating speed commands, and (iv) a controller operable to receive the speed commands and generate transmission ratio commands which control a ratio of a speed of the output shaft to a speed of the input shaft. The method includes the steps of limiting the torque supplied to the output shaft in a torque limited region near zero speed of the output shaft and modifying the transmission ratio command in the torque limited region.

BEST MODE FOR CARRYING OUT THE INVENTION

Figure 1:
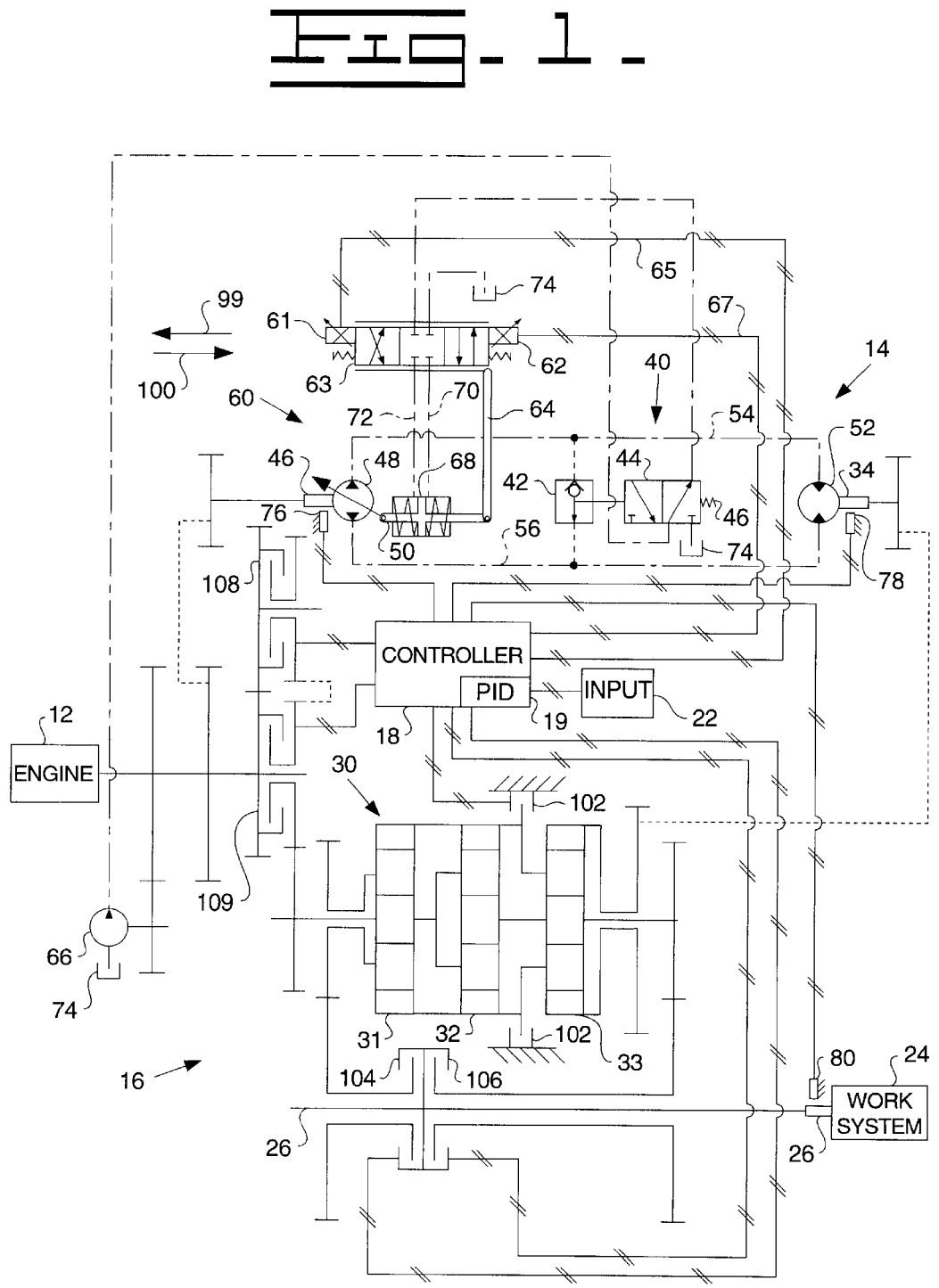
FIG. 1 is a schematic view of a hydro-mechanical, continuously variable transmission which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a transmission assembly 10 that incorporates the features of the present invention therein. The transmission assembly 10 is adapted for use in a work machine, such as a loader (not shown), having an engine 12. The transmission assembly 10 is of the continuously variable type which includes a continuously variable hydrostatic transmission 14, a mechanical transmission 16, a micro-processor based controller 18, and a command input arrangement 22. A work system 24 is connected to the transmission assembly 10 via a drive shaft 26. The work system 24 is typically the drive wheels or tracks of the work machine.

The hydrostatic transmission 14 is operatively connected to the engine 12 through a pump input drive shaft 46. The hydrostatic transmission 14 includes a variable displacement pump 48 and a motor 52 operatively connected to the variable displacement pump 48 by conduits 54 and 56 to form a hydraulic circuit. A displacement controller 50 sets the displacement of the variable displacement pump 48 and thus controls the flow of hydraulic fluid between the variable displacement pump 48 and the motor 52. Varying the flow varies the speed of the motor output shaft 34 of the motor 52.

The position of the pump displacement controller 50 is controlled by an electro-hydraulic servo mechanism 60. The servomechanism 60 includes a first solenoid or first actuator 61 and a second solenoid or second actuator 62, a three position four way valve 63, and a feedback arm 64. When a current, is supplied to the first actuator 61 via a signal line 65, the first actuator 61 moves the three position valve in the direction of arrow 100 so as to place the valve 63 in a first position. In the first position, the valve 63 causes high pressure fluid from a separate pump 66 to be supplied to a piston member 68 via a line 70 which causes the displacement controller 50 to move in the general direction of arrow 99. Movement of the displacement controller 50 in the general direction of arrow 99 places the variable displacement pump 48 in a positive displacement. Excess fluid exits the displacement controller 50 via a line 72 and is returned to a fluid sump 73. The force of the fluid on the piston member 68 also acts on the position feedback arm 64 in the general direction of arrow 99. An equilibrium is set up between the force exerted by the first actuator 61 in the general direction of arrow 100 and the force exerted by position feedback arm 64 in the general direction of arrow 99. Thus, for positive displacements, the position of the displacement controller 50 is proportional to the current supplied to the first actuator 61 as the first actuator command.

When a current is supplied to the second actuator 62 via a signal line 67, the second actuator 62 moves the three position valve in the direction of arrow 99 so as to place the valve 63 in a second position. In the second position, the valve 63 causes high pressure fluid from the charge pump 66 to be supplied to a piston member 68 via the line 72 which causes the displacement controller 50 to move in the general direction of arrow 100. Movement of the displacement controller 50 in the general direction of arrow 100 places the variable displacement pump 48 in a negative displacement. Excess fluid exits the displacement controller 50 via the line 70 and is returned to a fluid sump 73. The force of the fluid on the piston member 68 also acts on the position feedback arm 64 in the general direction of arrow 100. An equilibrium is set up between the force exerted by the second actuator 62 in the general direction of arrow 99 and the force exerted by position feedback arm 64 in the general direction of arrow 100. Thus, for negative displacements, the position of the displacement controller 50 is proportional to the current supplied to the second actuator 62 as the second actuator command. It should be appreciated that the first actuator 61 can only place the variable displacement pump 48 in positive displacements and the second actuator 62 can only place the variable displacement pump 48 in negative displacements.

The transmission 10 further includes a pressure cutoff circuit 40. The pressure cutoff circuit 40 includes a resolver valve 42 which directs the greater of the pressures in the line 54 or the line 56 to the pressure cutoff valve 44. Thus, the pressure supplied by the resolver valve 42 is the maximum pressure within the hydrostatic transmission 14. This maximum pressure acts on the pressure cutoff valve 44 in the general direction of arrow 100 and is opposed by a biasing spring 46 which acts in the general direction of arrow 99.

In a first mode of operation, pressure within the hydrostatic transmission 14, either within line 54 or 56, is unable to overcome the bias force of the spring 46. In the first mode of operation, the pressure cutoff valve 44 directs fluid from the charge pump 66 to the valve 63 which controls the displacement of the variable displacement pump 48. In a second mode of operation, the pressure from the resolver valve 42 overcomes the bias force of the spring 46 and fluid from the charge pump 66 is blocked and fluid within the valve 63 is diverted to the sump 74. It should be appreciated that diverting fluid from the displacement controller valve 63 to the sump 74 reduces the fluid pressure on the piston member 68 causing the piston member 68 to return to a center position. Moving the piston member 68 toward the center position reduces the displacement of the variable displacement pump 48 which automatically decreases the fluid flow and pressure within the lines 54, 56. Also, decreasing the displacement of the variable displacement pump 48 reduces the overall transmission ratio through the transmission 10.

The mechanical transmission 16 includes a summing planetary gear arrangement 30, having a first planetary gear set 31, a second planetary gear set 32, and a third planetary gear set 33 which selectively combines the output from the continuously variable hydrostatic transmission 14 with the output of the engine 12 to drive the output shaft 26. To select a first gear range 110, a clutch 102 and a clutch 104 are engaged. To select a second forward gear range 120, a clutch 108 and the clutch 104 are engaged. To select a third forward gear range 130, the clutch 108 and a clutch 106 are engaged. To select a second reverse gear range 140, a clutch 109 and the clutch 104 are engaged. To select a third reverse gear range 150, the clutch 109 and a clutch 106 are engaged.

The transmission 10 further includes a transmission input speed sensor 76 operative to sense the speed of the pump input shaft 46 and direct a transmission input speed signal representative of the transmission input speed or engine speed to the controller 18. The transmission 10 yet further includes a motor speed sensor 78 operative to sense the speed of the motor output shaft 34 and direct a motor speed signal representative of the motor output speed to the controller 18. The motor speed signal combined with the transmission input speed signal can also be used to determine a transmission output speed and a machine travel speed if the engagement state of the clutches 102, 104, 106, 108, and 109 are known.

The transmission 10 further includes a transmission output speed sensor 80 is operative to sense the transmission output speed and direct a transmission output speed signal to the controller 18. Either of the motor speed sensor 78 combined with the input speed sensor 76 or the transmission output speed sensor 80 can be used to calculate the transmission output speed or the machine travel speed. However, in the present invention, the motor speed sensor 78 is used to precisely control the displacement of the pump 48 and therefore has a much higher resolution and lower dropout than the transmission output speed sensor 80. Thus, it is preferable to use the motor speed sensor 78 and the engagement state of the clutches 102, 104, 106, 108, and 109 to determine the transmission output speed and the machine travel speed. However, it is still possible and practical to use the output speed sensor 80 to determine machine travel speed.

The command input arrangement 22 receives operator inputs and transmits desired velocity and directional signals to the controller 18. The controller 18 includes RAM and ROM (not shown) that store transmission control software. The controller 18 reads the desired velocity, reads the directional signals, and transmits clutch control signals to control the engagement of the clutches 102, 104, 106, 108, 109 to engage the appropriate gear ratio as described above. The controller 18 also sends transmission ratio commands to the displacement controller 50 via the signal lines 65,67 to control the displacement of the variable displacement pump 48 and machine travel speed. The actual engine speed is fed back into a PID underspeed controller 19 and compared to the lug limit of the engine 12 to produce an underspeed value having a proportional term and an integral term. This underspeed value is then used to generate an underspeed command 135 described below.

Figure 2:
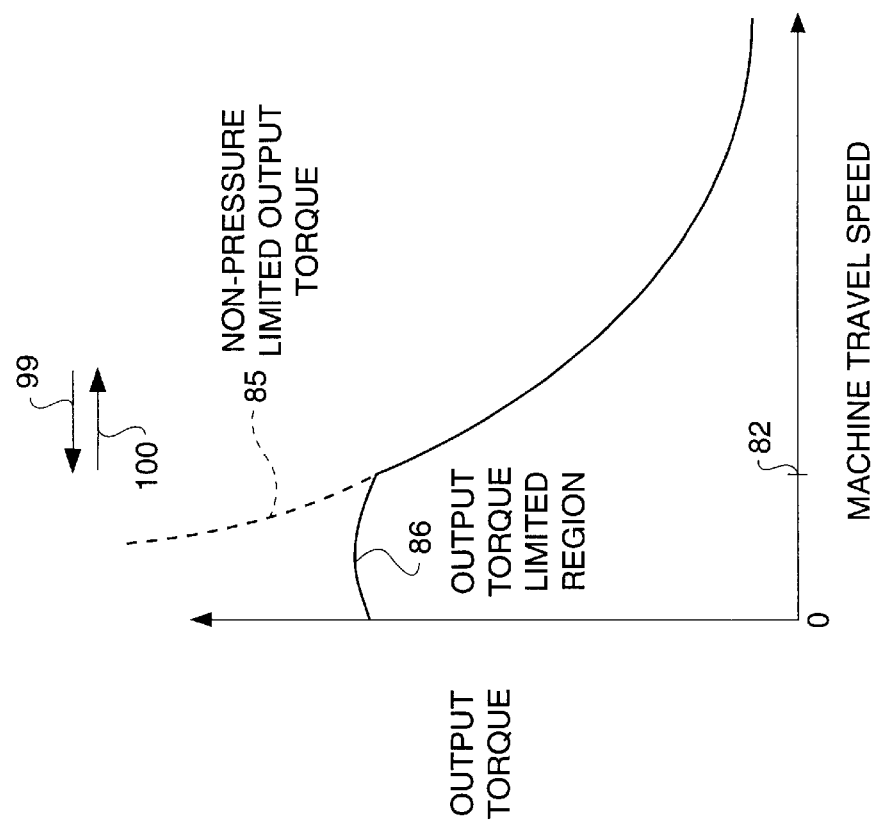
FIG. 2 is a graph of machine travel speed versus output torque showing a output torque limited region.

Referring now to FIG. 2, there is shown a graph of output torque of the transmission 10 versus machine travel speed. As machine travel speed decreases, the output torque 85 can approach an infinite level near zero travel speed if the output torque through the transmission is not limited. However, at a limit speed 82, the output torque through the transmission 10 is limited by the pressure cutoff circuit 40 described above. In a output torque limited region 86, where the machine travel speed is less than the limit speed 82, the output torque of the transmission 10 is limited by the reduction in transmission ratio caused by the pressure cutoff circuit 40. It should be appreciated that if the pump 48 and motor 52 were replaced by a pair of electric motor/generators, the torque limited region would be caused by a current or voltage limit within one of the motor/generators.

The limit speed 82 is a function of the external load on the engine 12 which is not transmitted through the transmission 10, the resolution of the speed sensors, the output torque limited setting whereby pressure is limited in the hydrostatic transmission 14, and the engine characteristics (such as torque map and governor setting). Such external loads may be caused by the engine powering implements on the work machine in addition to supplying power to the transmission 10. For example, if a heavy implement load is placed on the engine 12 then the limit speed 82 would have to be adjusted in the direction of arrow 99 to account for the implement load on the engine 12 whereas if a light implement load is placed on the engine 12 then the limit speed 82 would have to be adjusted in the direction of arrow 100 to account for the light implement load on the engine 12.

If the implement load is not known, then the limit speed 82 is chosen with the assumption that all of the power is going through the transmission 10 to the wheels or tracks of the work machine. At this point the engine cannot lug the because the transmission 10 is operating in an output torque limited range which when reflecting the limited output torque back to the engine 12 via the transmission ratio, the required input torque is less than what the engine could potentially provide.

Figure 3:
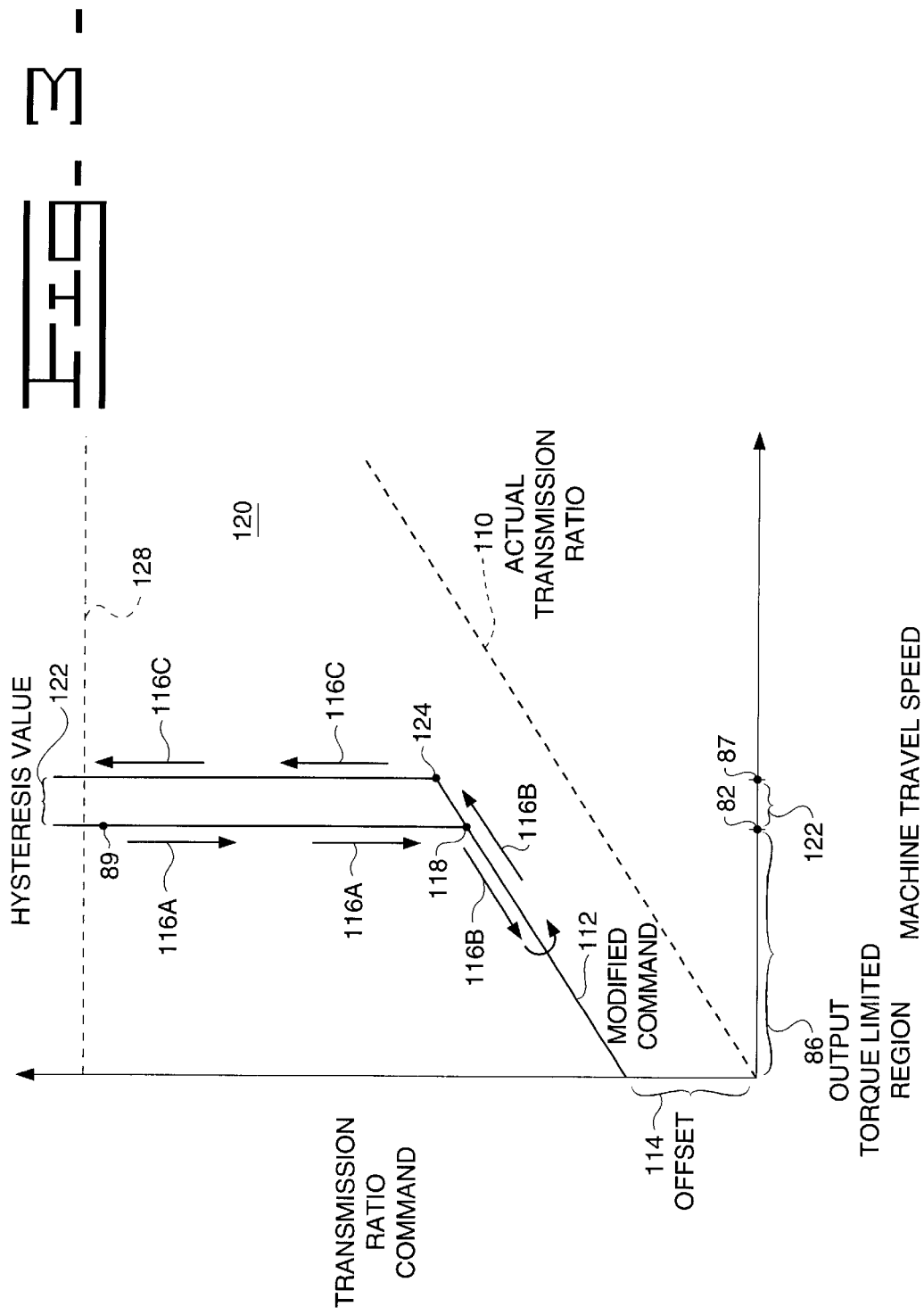
FIG. 3 is graph of a first embodiment of present invention showing the transmission ratio limited to an offset value from the actual ratio.

Referring now to FIG. 3, there is shown a first embodiment of the modification of the transmission ratio command, or reference command, as the transmission 10 operates near the output torque limited region 86 described in FIG. 2. It should be appreciated that the reference command could also be the travel speed command of the work machine. An actual transmission ratio 110 for a given machine travel speed is plotted as a dotted line. When the transmission 10 is operating in an unmodified transmission ratio region 120 at a machine travel speeds greater than limit speed 82, the reference transmission ratio commands are not modified. The reference transmission ratio commands are not modified until the machine travel speed falls below the limit speed 82.

If the reference transmission ratio command reaches an operating point 89 at the limit speed 82, the reference transmission ratio command follows the path 116A and the reference transmission ratio command jumps to a point 118 on a modified command 112. The modified reference command 112 is sum of the actual transmission ratio 110 and an offset ratio 114. The offset ratio 114 is an acceptable error between the reference transmission ratio command and the actual transmission ratio 110.

The controller 18 can continue to reduce the machine travel speed via an underspeed command in order to prevent the engine from stalling or lugging too far below the lug limit. The underspeed command is governed by the following equation:

underspeedCommand=referenceCommand−Iterm−Pterm

Thus, the underspeed command is the result of the reference transmission ratio command, less the integral term of the PID underspeed controller 19, and less the proportional term of the PID underspeed controller 19. It should be appreciated that once the machine travel speed falls below the limit speed 82, a large adjustment is made to the reference transmission ratio command. Therefore, and adjustment must be made to the integral term within the PID underspeed controller 19 to compensate for this large change in the reference transmission ratio command in order to keep the underspeed command constant. For example, the actual reference transmission ratio command is modified such that the reference transmission ratio command changes by a first value (between the point 89 and the point 118) and the proportional term of the underspeed command from the PID underspeed controller 19 changes by a second value. The integral term from the PID underspeed controller 19 must be adjusted by an amount such that the sum of the reference transmission ratio command, the proportional term from the PID underspeed controller 19, and the integral term from the PID underspeed controller 19 remain the same after the transmission ratio command has been modified as they were prior to being modified. Therefore, the integral term from PID underspeed controller 19 must be adjusted by an amount equal to the first value less the second value.

The reference transmission ratio command follows a path 116B along the modified command 112 while operating in the output torque limited region 86 (i.e. travel speed less than the limit speed 82). The reference transmission ratio command follows the path 116B until the machine travel speed exceeds the limit speed 82 by hysteresis value 122 at the point 124 and machine travel speed 87. Beyond the point 124, the transmission 10 is not operating in the output torque limited region and the reference transmission ratio command accelerates toward the desired transmission ratio 128 from the operator input 22.

The hysteresis value 122 is chosen as a speed difference in excess of the limit speed 82 at which it is unlikely that the machine travel speed will immediately fall below the limit speed 82. Without the hysteresis value 122, the reference transmission ratio command could continually move between the unmodified transmission ratio command region 120 and the modified command 112. The continual movement between the unmodified transmission ratio command region 120 and the modified reference transmission ratio command 112 would require continual modification of the reference transmission ratio command and the continual adjustment of the integral term from the PID underspeed controller 19 which would impair the operation of the transmission 10.

Figure 4:
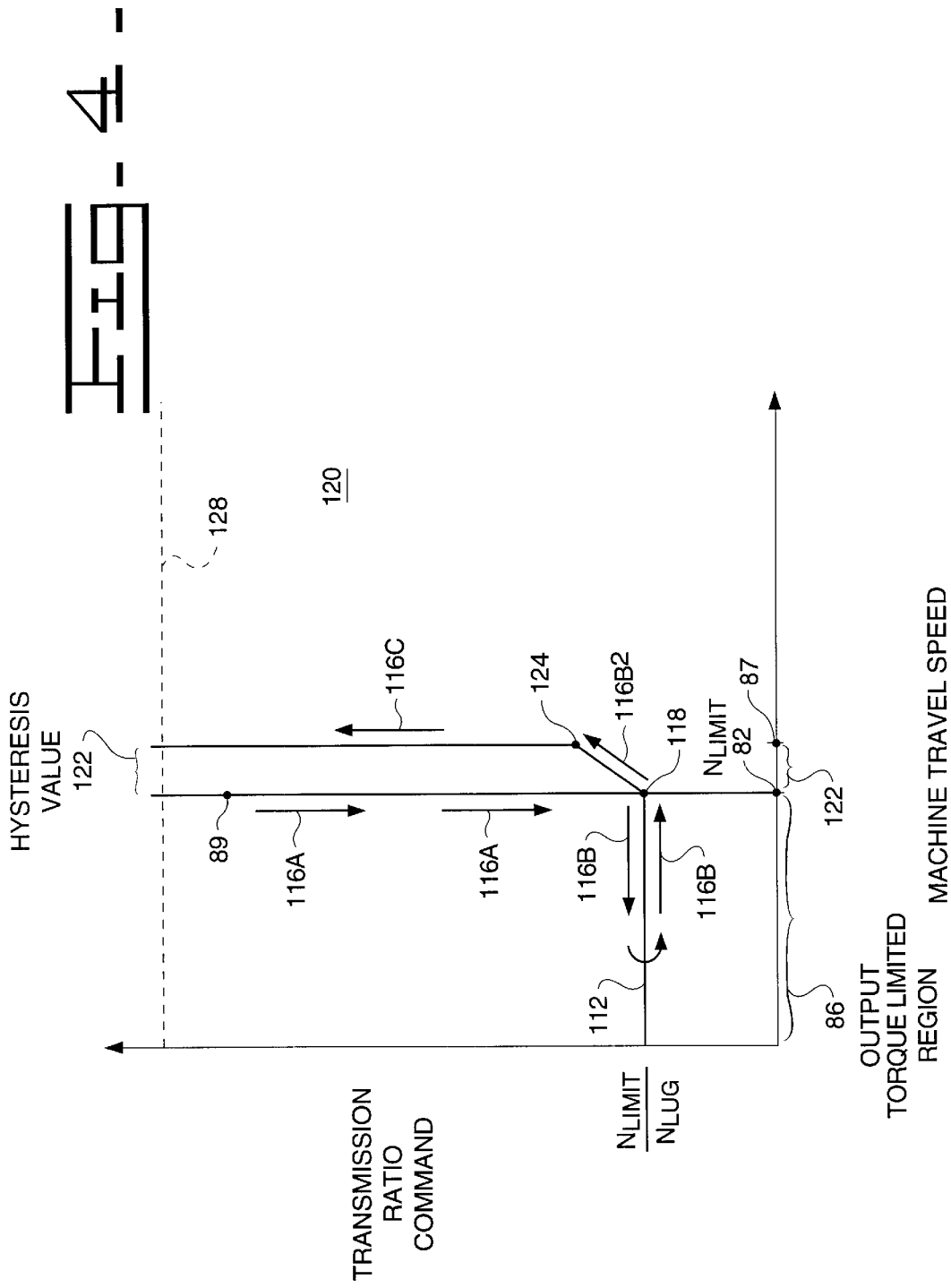
FIG. 4 is a graph of the second embodiment of the present invention showing the transmission ratio command limited to a constant value.

Referring now to FIG. 4, there is shown a second embodiment of the modification of the reference transmission ratio command as the transmission 10 operates near the output torque limited region 86. When the transmission 10 is operating in the unmodified transmission ratio region 120 at a machine travel speeds greater than limit speed 82, the reference transmission ratio commands are not modified. Reference transmission ratio commands are not modified until the machine travel speed falls below the limit speed 82. If the reference transmission ratio command reaches an operating point 89 at the limit speed 82, the reference transmission ratio command follows the path 116A and jumps to the point 118 on a modified reference command 112. The modified reference command 112 of the second embodiment is a constant ratio of the limit speed 82 to the lug limit of the engine. Once again, as the travel speed falls below the limit speed 82, a large adjustment is made to the reference transmission ratio and the integral term of the PID underspeed controller 19 is adjusted as in the first embodiment shown in FIG. 3.

The reference transmission ratio command follows a path 116B along the modified command 112 while operating in the output torque limited region 8G. The reference transmission ratio command follows the path 116B until the machine travel speed exceeds the limit speed 82, at which time the command follows the path 116B2 which has the same rate of change as the actual transmission ratio 110 shown in FIG. 3. The reference transmission ratio command follows the path 116B2 until the machine travel speed exceeds the limit speed 82 by hysteresis value 122 at the point 124 and machine travel speed 87. Beyond the point 124, the transmission 10 is not operating in the output torque limited region and the reference transmission ratio command accelerates toward the desired transmission ratio 128 from the operator input 22.

It should be appreciated that the first embodiment, shown in FIG. 3, has the advantage of producing modified transmission ratio commands 112 which are more responsive to changes in actual machine travel speed whereas the second embodiment, shown in FIG. 4, has the advantage of producing modified transmission ratio commands 112 which are more stable at low machine travel speeds due to the constant transmission ratio command.

Figure 5:
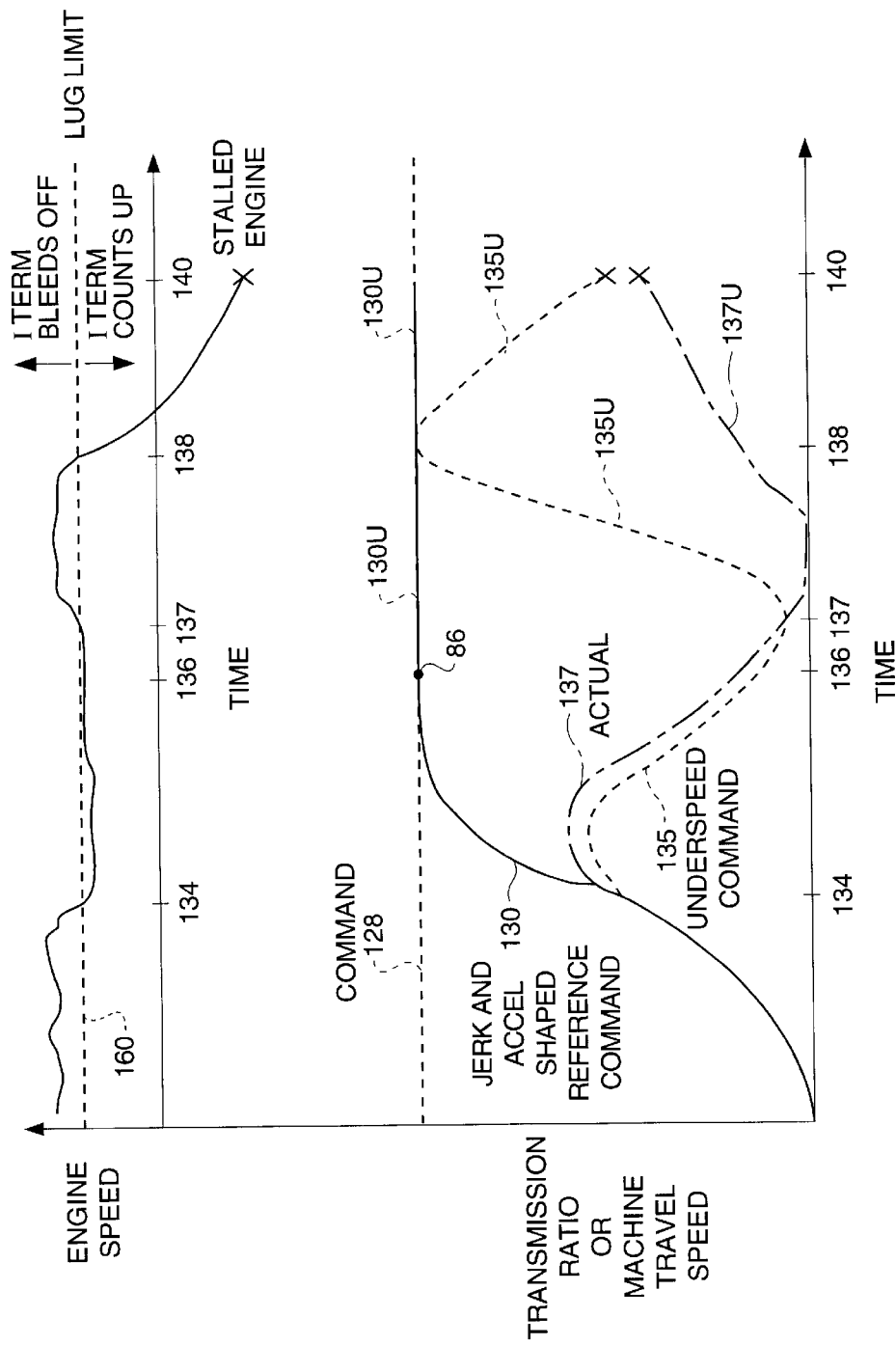
FIG. 5 is a graph of output speed and engine speed showing the effects of an unmodified transmission ratio command.

Referring now to FIG. 5, there is shown a graph of engine speed and transmission ratio (also shown as machine travel speed) versus time for an unmodified reference transmission ratio command 130U. In response to an operator ratio command 128 from the operator input 22, the controller 18 generates a reference transmission ratio command 130 which employs certain jerk and acceleration limits. At a time 134, the work machine encounters a load and the engine begins to fall below the lug limit 160. In response, the controller 18 generates an underspeed command 135 which reduces the actual transmission ratio to keep the engine speed within a desirable operating range.

At a time 136, the machine travel speed falls below the speed limit 82 (shown in FIG. 2). It should be appreciated that the limit speed 82 is an approximation when the transmission 10 actually enters the output torque limited region 86 caused by the pressure cutoff circuit 40. The exact speed at which the pressure cutoff circuit 40 is engaged is difficult to estimate. The limit speed 82 is conservatively estimated as if the entire load on the engine 12 is being transmitted through the transmission 10. As the output load continues to increase, the hydrostatic transmission 14 enters into the actual output torque limited region 86 at a time 137 where the displacement of the pump 48 is decreased by the pressure cutoff circuit 40.

As the pressure cutoff circuit 40 is engaged, the speed of the engine 12 recovers due to the reduction in the transmission ratio caused by the pressure cutoff circuit 40. Thus reducing the input torque with a constant output torque. Since the unmodified reference command 130U has not been modified and the integral term from the PID underspeed controller 19 has not been adjusted, the unmodified underspeed command 135U heads back toward the unmodified reference command 130U because engine speed is above the lug limit. As the integral term bleeds off, the unmodified underspeed command 135U approaches the unmodified reference command 130U.

The transmission 10 exits the output torque limited region 86 when the output torque is no longer limited because the pressure cutoff circuit 40 becomes inactive and the transmission ratio begins to increase the machine travel speed in excess of the speed 87 (shown in FIGS. 3 and 4) at a time 138. At the time 138, the unmodified underspeed command 135U and the unmodified reference command 130U differs significantly from the actual transmission ratio 137U. If a new load, enough to cause the engine to lag, is encountered subsequent to the time 138, then the unmodified reference command 130U and the unmodified underspeed command 135U is so far from the actual transmission ratio 137U that the unmodified underspeed command 135U can't decrease quickly enough from the unmodified reference command 130U. Therefore, the unmodified underspeed command 135U actually causes the actual transmission ratio to increase in response to the new load. The unmodified underspeed command 135U is unable to reduce the transmission ratio 137U to respond to the new load before the engine stalls at a time 140. Therefore, if the reference transmission ratio command is not modified and the integral term is not adjusted at the time 136, the transmission 10 can potentially stall the engine 12 if a new load is encountered after the transmission exits the output torque limited region 86.

Figure 6:
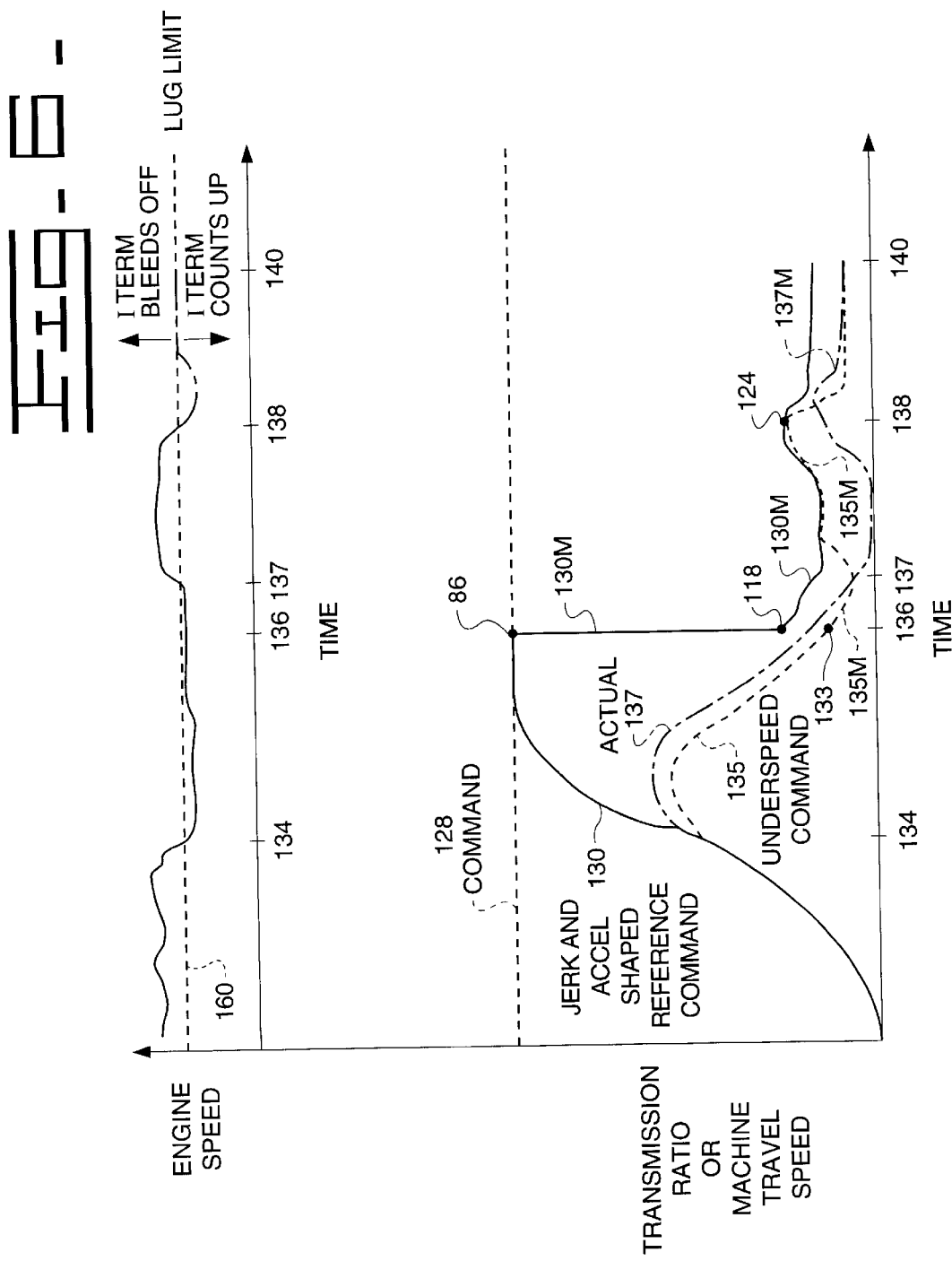
FIG. 6 is a graph of output speed and engine speed showing the effects of a modified transmission ratio command.

Referring now to FIG. 6, there is shown a graph of engine speed and transmission ratio (and machine travel speed) versus time for an modified transmission ratio command 130M. The transmission operates as in FIG. 5 until the transmission approaches the output torque limited region 86 (shown in FIG. 2) at the time 136. At this time, the reference transmission ratio command 130 is adjusted to follow the path from the point 89 to the point 118 (shown in FIGS. 3 and 4). The integral term of the PID underspeed controller 19 is adjusted as described above such that the underspeed command 135 is continuous with a modified underspeed command 135M at a point 133. It should be appreciated that the limit speed 82 is an approximation when the transmission 10 actually enters the output torque limited region 86 caused by the pressure cutoff circuit 40. The exact speed at which the pressure cutoff circuit 40 is engaged is difficult to estimate. The limit speed 82 is conservatively estimated as if the entire load on the engine 12 is being transmitted through the transmission 10. As the output load continues to increase, the hydrostatic transmission 14 enters into the actual output torque limited region 86 at a time 137 where the displacement of the pump 48 is decreased by the pressure cutoff circuit 40.

As the pressure cutoff circuit 40 is engaged, the speed of the engine 12 recovers (as less torque is requested from the engine 12 than the engine can produce at the lug limit) and the modified underspeed command 135M heads back toward the modified reference command 130M because the engine is above the lug limit. The transmission 10 exits the output torque limited region at the time 138. If the new load is encountered subsequent to the time 138 and the reference transmission ratio command was modified and the integral term was adjusted at the time 136, then the modified reference command 130M and the modified underspeed command 135M are reasonably close to the actual transmission ratio 137M that the underspeed command 135M is able to quickly respond to the new load by decreasing actual transmission ratio 137M. The quick response to the new load causes the engine 12 to operate within the desirable operating range between the time 138 and the time 140. Therefore, modification of the reference transmission ratio command and adjustment of the integral term from the PID underspeed controller 19 at the time 136 is key to preventing engine stalls subsequent to the transmission 10 exiting the output torque limited region at the time 138.

It should be appreciated that the reference transmission ratio command at a given engine speed is equivalent to a reference output speed command. Furthermore, the underspeed ratio command at a given engine speed is equivalent to an underspeed output speed command. In such a case the actual output is expressed as an output speed.

INDUSTRIAL APPLICABILITY

In operation, the transmission ratio commands are not modified until the machine travel speed falls below the limit speed 82. If the transmission ratio command reaches an operating point 89 at the limit speed 82, the transmission ratio command follows the path 116A and jumps to a point 118 on a modified command 112 (shown in FIGS. 3 or 4). Due to the large adjustment is made to the reference transmission ratio command and the integral term of the PID underspeed controller 19 is adjusted such that the sum of the reference transmission ratio command, the proportional term of the PID underspeed controller 19, and the integral term of the PID underspeed controller 19 remain the same after the reference transmission ratio command has been modified as they were prior to being modified.

The transmission ratio command follows a path 116B along the modified command 112 while operating in the output torque limited region 86 (i.e. travel speed less than the limit speed 82). The reference transmission ratio command follows the path 116B until the machine travel speed exceeds the speed 87.

Referring to FIG. 6, there is shown the results of modifying the reference transmission ratio command 135M and adjusting the integral term of the PID underspeed controller 19. If the new load is encountered subsequent to the time 138, then the modified reference command 130M and the modified underspeed command 135M are reasonably close to the actual transmission ratio 137M that the underspeed command 135M is able to quickly respond to the new load by decreasing actual transmission ratio 137M. The quick response to the new load causes the engine 12 to operate within the desirable operating range between the time 38 and the time 140. Without the modification of the reference transmission ratio command 130M and the adjustment of the integral term of the PID underspeed controller, the engine would stall at the time 140 (see FIG. 5). Therefore, modification of the reference transmission ratio command and adjustment of the integral term from the PID underspeed controller 19 at the time 136 is key to preventing engine stalls subsequent to the transmission 10 exiting the output torque limited region at the time 138.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An apparatus for controlling a continuously variable transmission, comprising:
   an input shaft driven by an engine;
   an output shaft;
   an operator input for generating speed commands; and
   a controller operable to receive the speed commands and generate transmission ratio commands which control a ratio of a speed of the output shaft to a speed of the input shaft, wherein:
      torque supplied to the output shaft is limited in a torque limited region near zero speed of the output shaft, and
      the transmission ratio command is modified in the torque limited region.

2. The apparatus of claim 1, wherein:
   the torque limited region is defined by a limit speed of the output shaft,
   the engine has a lug limit, and
   the ratio command is modified to the ratio of the limit speed to the lug limit.

3. The apparatus of claim 1, wherein:
   the torque limited region is defined by a limit speed,
   the actual transmission ratio is a linear function of the speed of the output shaft, and
   the transmission ratio command is modified to the actual transmission ratio for the output speed plus an offset value when the output speed is below the limit speed.

4. The apparatus of claim 3, wherein the transmission ratio command is modified until the output speed exceeds the limit speed by a hysteresis value.

5. The apparatus of claim 1, further comprising a hydrostatic transmission, wherein:
   the torque limited region corresponds to a pressure cutoff of the hydrostatic transmission.

6. The apparatus of claim 5, further comprising:
   a variable displacement pump;
   a displacement controller which controls the displacement of the variable displacement pump; and
   a pressure cutoff valve responsive to pressure within the hydrostatic transmission exceeding the pressure limit, wherein:
      the pressure cutoff valve releases fluid to a sump in response to the pressure within the hydrostatic transmission exceeding the pressure limit, and
      the released fluid causes the displacement controller to allow the displacement of the variable displacement pump to move toward zero displacement which decreases the pressure within the hydrostatic transmission.

7. The apparatus of claim 1, further including:
   a closed loop PID controller, wherein an integral term thereof is adjusted when the transmission enters the torque limited region.

8. The apparatus of claim 7, wherein the ratio command changes by first value,
   a proportional term of the PID controller changes by a second value, and
   the integral term is adjusted by the first value less the second value.

9. The apparatus of claim 1, further comprising an electric motor and an electric generator, wherein:

the torque limited region corresponds to a current limit of one of the electric motor or electric generator.

10. The apparatus of claim 1, further comprising a speed sensor operable measure the speed of the input shaft, wherein said controller generates output speed commands which are the product of the transmission ratio command and the speed of the input shaft.

11. A method for controlling a continuously variable transmission having (i) an input shaft driven by an engine, (ii) an output shaft, (iii) an operator input for generating speed commands, and (iv) a controller operable to receive the speed commands and generate transmission ratio commands which control a ratio of a speed of the output shaft to a speed of the input shaft, comprising the steps of:

limiting the torque supplied to the output shaft in a torque limited region near zero speed of the output shaft; and modifying the transmission ratio command in the torque limited region.

12. The method of claim 11, further comprising the steps of:

defining the torque limited region by a limit speed of the output shaft;

determining a lug limit of the engine; and modifying the ratio command limited to the ratio of the limit speed to the lug limit.

13. The method of claim 11, the modifying step further comprising the steps of:

defining the torque limited region by a limit speed;

determining a linear function between the actual transmission ratio and the speed of the output shaft; and modifying the transmission ratio command to the actual transmission ratio plus an offset value when the output speed is below the limit speed.

14. The method of claim 13, further comprising the step of continuing to modify the transmission ratio command until the output speed exceeds the limit speed by a hysteresis value subsequent to the modifying step.

15. The method of claim 11, the transmission further including a hydrostatic transmission wherein the torque limited region corresponds to a pressure cutoff of the hydrostatic transmission.

16. The method of claim 15, the hydrostatic transmission further having (i) a variable displacement pump and (ii) a displacement controller which controls the displacement of the variable displacement pump; and, (iii) a pressure cutoff valve responsive to pressure within the hydrostatic transmission exceeding the pressure limit, further comprising the steps of releasing fluid to a sump with the pressure cutoff valve in response to the pressure within the hydrostatic transmission exceeding the pressure limit; and moving the displacement of the variable displacement pump toward zero displacement in response to the releasing step.

17. The method of claim 11, the transmission further having a closed loop PID controller, further including the steps of adjusting an integral term of the PID controller when the transmission enters the torque limited region.

18. The method of claim 17, the adjusting step further including the steps of:

changing the ratio command changes by first value;

changing a proportional term of the PID controller by a second value; and adjusting the integral term by the first value less the second value.

19. The method of claim 11, the transmission further having further comprising an electric motor and an electric generator, further including the step of defining the torque limited region with a current limit of one of the electric motor or electric generator.

20. The method of claim 11, the transmission further having a speed sensor operable to measure the speed of the input shaft, further comprising the step of generating a speed command which is the product of the transmission ratio command and the speed of the input shaft.

* * * * *